P. Dickson,
Converting Motion.

Nº 37,953. Patented Mar. 24, 1863.

Witnesses.

Inventor.
P. Dickson
per Munn &co
Attorney

UNITED STATES PATENT OFFICE.

PERRY DICKSON, OF UTICA, MINNESOTA.

IMPROVEMENT IN CONVERTING MOTION.

Specification forming part of Letters Patent No. 37,953, dated March 24, 1863.

*To all whom it may concern:*

Be it known that I, PERRY DICKSON, of Utica, in the county of Winona and State of Minnesota, have invented a new and useful Improvement in Means of Converting Reciprocating into Rotary Motion; and I do hereby declare that the following is a full, clear, and exact description of the same, reference being had to the accompanying drawings, forming a part of this specification, in which—

Figure 1:
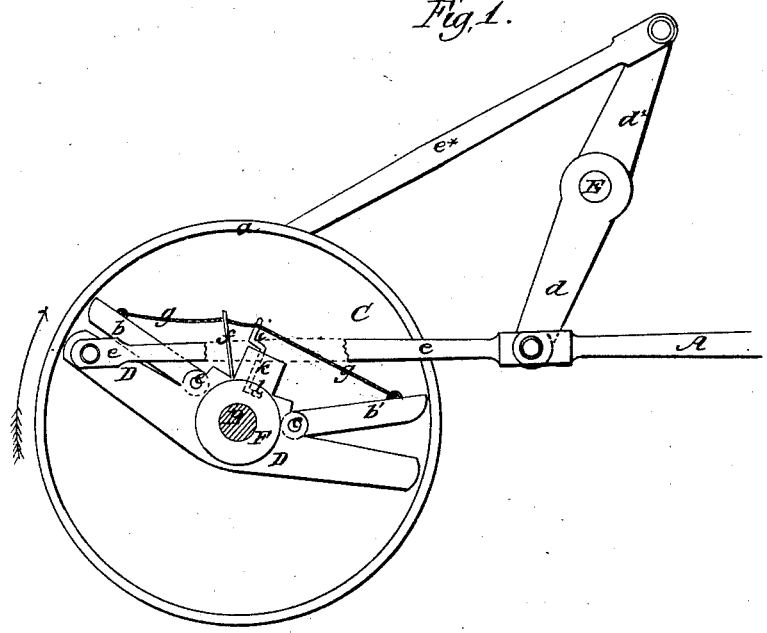
Figure 2:
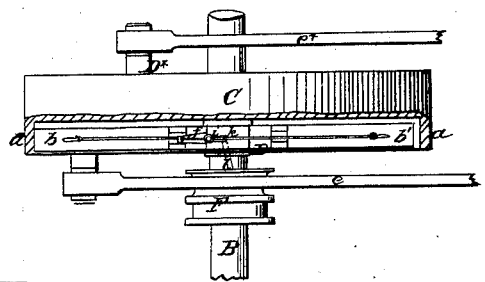

Figure 1 is a side view of my apparatus adapted to transmitting motion from the piston-rod to the shaft of a steam-engine. Fig. 2 is a top view of the principal portion of the same, partly in section.

Similar letters of reference indicate corresponding parts in both figures.

This invention relates to the employment, to operate upon the interior of the rim of a wheel or pulley for the purpose of producing its rotary motion, of a system of dogs so applied in connection with a lever arranged to oscillate upon the shaft of the said wheel or pulley that in the movement of the lever in one direction the dogs will work free of the rim and in its movement in the opposite direction they will bite the rim and transmit motion to the said wheel or pulley and to its shaft.

The improvement consists in certain devices employed in connection with a double system of dogs to provide for the reversal of the rotary motion at pleasure.

To enable others to make and apply my invention, I will proceed to describe its construction and operation.

A is the pitman through which motion is to be transmitted from the piston-rod of the engine to the shaft B. C is the wheel or pulley, fast upon the shaft B, and having a projecting rim, $a$, on each side for the dogs to act upon. D is one of two similar levers which are fitted to oscillate upon the shaft B, one on each side of the wheel, and extending nearly across the wheel inside of the rim. D is the other lever, but this is only partly shown in Fig. 2. Each lever carries two dogs, $b\ b'$, one on one lever and one on the other, constituting one system and operating to drive the wheel in one direction, and the other two constituting another system, operating to drive the wheel in the other direction. These dogs are severally pivoted to their respective levers by pins $c\ c$, one to each arm of the lever, and may be arranged to fall back toward the levers by gravitation, or have springs applied in connection with them to throw them back. No springs are shown for this purpose in the drawings, and the dogs represented are supposed to fall back by gravitation. This falling back of the dogs toward the levers brings their points in contact with the inside of the rim of the wheel, so that when the lever is turned in either direction the dog, which is in front, according to that direction, and in contact with the rim $a$, is caused to bite the rim and make the wheel turn with it, and when the lever is turned in the opposite direction the friction of the dog on the rim will free it. The dog $b$ is represented in Fig. 1 in the first-mentioned condition, the lever moving in the direction of the arrow shown in that figure, and the dog $b$ turning the wheel in that direction. The oscillating motion of the two levers D D* is obtained from the rock-shaft E, arranged parallel with the shaft B, the said rock-shaft having two opposite arms, $d\ d^*$, which are connected by rods $e\ e^*$, one with each of the two levers D D*. The pitman A is connected with one arm of the rock-shaft E, and produces the rocking motion thereof by which the rods $e\ e^*$ are caused to produce such an oscillating movement of the levers that one always moves in the reverse direction to the other, the object of such reverse movements being that each may carry back one of the dogs of one system while the other brings the other dog of the same system into operation, and hence the two keep up a continued rotary movement of the wheel. The two dogs on each lever are, of course, not allowed to come into contact with the rim at once, and hence each lever has attached to it a spring, $f$, for the purpose of holding one dog out of contact. The dog $b'$ is the one represented in Fig. 1 as being held out of contact and inoperative, and is connected with the said spring by a cord or chain, $g$. The other dog, $b$, which is the dog for moving the wheel ahead—*i. e.*, in the direction of the arrow shown in Fig. 1—is also connected with the spring by the cord or chain, but the portion between that dog and the spring is slack in the normal condition of the spring and does not interfere with the dog. The portion of the cord or chain $g$ between the springs $f$ and the dog $b'$ is connected with a crank, $i$, on one end of a small pin, $k$, which is fitted into a suitable bearing in the lever, and at the other end of the said pin there is another crank, $l$, which protrudes through a slot in the hub of the lever on the side farthest from the wheel. The shaft B is fitted on the outer side of the lever with a sliding collar, F, which, when it is desired to reverse the rotary motion of the wheel and shaft, is slid along the shaft toward the lever, and so caused to act upon the crank $l$ in such manner as to turn the pin $k$ in such a direction that the crank $i$ will draw upon the portion of the cord or chain $g$ between it and the dog $b$ and overcome the tension of the spring $f$ and draw the dog $b$ out of contact with the rim $a$, at the same time letting slack the portion of the cord or chain between it and the dog $b'$ and allowing the latter dog, $b'$, to come into operation for turning the wheel and shaft in the opposite direction to the arrow. When the sliding collar F is moved back away from the crank $l$, the spring $f$ draws the dog $b'$ out of gear and lets the dog $b$ drop into gear again. The crank-pins $k$, belonging to both levers, should be connected in such manner that both may operate simultaneously on the dogs of the two levers to bring one system out and the other system into operation. By these means of reversing the action of the dogs the direction of the rotation of the wheel C and shaft can be changed at pleasure without stopping the engine. The double system of dogs and reversing apparatus can be applied in connection with the driving-wheels of a locomotive, one of the levers D D* being applied to one driver and the other to the other driver, and in this way the locomotive can be driven by a single engine without any dead-points.

In an apparatus for transmitting a reversible intermittent rotary motion a single lever and two dogs only are necessary, the said dogs having applied in connection with them the spring $f$, pin $k$, cranks $i$ $l$, and cord or chain $g$, as described.

What I claim as my invention, and desire to secure by Letters Patent, is—

The employment, in combination with each other and the dogs $b$ $b^*$ and their carrying-levers, of a pin, $k$, with cranks $i$ $l$, a spring, $f$, and a cord or chain, $g$, the whole operating substantially as and for the purpose herein set forth.

PERRY DICKSON.

Witnesses:
H. W. HILL,
H. C. PARROTT.